United States Patent
Hecht et al.

(10) Patent No.: US 9,858,918 B2
(45) Date of Patent: Jan. 2, 2018

(54) ROOT CAUSE ANALYSIS AND RECOVERY SYSTEMS AND METHODS

(71) Applicant: GM GLOBAL TECHNOLOGY OPERATIONS LLC, Detroit, MI (US)

(72) Inventors: Ron M. Hecht, Ra'Anana (IL); Yael Shmueli Friedland, Tel Aviv (IL); Ariel Telpaz, Netanya (IL); Eli Tzirkel-Hancock, Ra'Anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 15/070,970

(22) Filed: Mar. 15, 2016

(65) Prior Publication Data

US 2017/0270908 A1 Sep. 21, 2017

(51) Int. Cl.

| | | |
|---|---|---|
| *G10L 15/00* | (2013.01) | |
| *G10L 15/01* | (2013.01) | |
| *G10L 15/07* | (2013.01) | |
| *G10L 15/22* | (2006.01) | |
| *G10L 25/51* | (2013.01) | |

(52) U.S. Cl.
CPC .............. *G10L 15/01* (2013.01); *G10L 15/07* (2013.01); *G10L 15/22* (2013.01); *G10L 25/51* (2013.01); *G10L 2015/223* (2013.01)

(58) Field of Classification Search
CPC ............. H04L 41/0213; H04L 41/0226; H04L 41/0233; G06F 15/177; G06F 8/51

USPC .............. 704/9, 231–257, 270–275; 707/10; 709/220–221; 700/108
See application file for complete search history.

(56) References Cited

U.S. PATENT DOCUMENTS

| | | | |
|---|---|---|---|
| 8,190,718 B1 * | 5/2012 | Bishara | G06F 8/51 709/220 |
| 9,368,108 B2 * | 6/2016 | Liu | G10L 15/187 |
| 9,437,186 B1 * | 9/2016 | Liu | G10L 15/05 |
| 2005/0075748 A1 * | 4/2005 | Gartland | G05B 19/4189 700/108 |
| 2007/0288467 A1 * | 12/2007 | Strassner | H04L 41/0226 |

* cited by examiner

*Primary Examiner* — Charlotte M Baker
(74) *Attorney, Agent, or Firm* — Lorenz & Kopf, LLP

(57) ABSTRACT

Methods and systems are provided for recovering from an error in a speech recognition system. In one embodiment, a method includes: receiving, by a processor, a first command recognized from a first speech utterance by a first language model; receiving, by the processor, a second command recognized from the first speech utterance by a second language model; determining, by the processor, at least one of similarities and dissimilarities between the first command and the second command; processing, by the processor, the first command and the second command with at least one rule of an error model based on the similarities and dissimilarities to determine a root cause; and selectively executing a recovery process based on the root cause.

20 Claims, 3 Drawing Sheets

ROOT CAUSE ANALYSIS AND RECOVERY SYSTEMS AND METHODS

TECHNICAL FIELD

The technical field generally relates to speech systems, and more particularly relates to methods and systems for detecting a root cause of a speech recognition error and recovering from the error based on the root cause.

BACKGROUND

Speech systems perform speech recognition on speech uttered by a user. For example, vehicle speech system performs speech recognition on speech uttered by an occupant of the vehicle. The speech utterances typically include commands that control one or more features of the vehicle or other systems accessible by the vehicle speech system.

In some instances, errors may occur in the speech recognition. Speech recognition errors are problematic and can cause users to stop using the system. For example, the user may not understand why the error is occurring and or understand how to fix the error so the user simply stops using the speech system.

Accordingly, it is desirable to provide methods and systems for identifying a root cause of a speech recognition error. It is further desirable to provide methods and system for recovering from errors based on an identified root cause. Furthermore, other desirable features and characteristics of the present invention will become apparent from the subsequent detailed description and the appended claims, taken in conjunction with the accompanying drawings and the foregoing technical field and background.

SUMMARY

Methods and systems are provided recovering from an error in a speech recognition system. In one embodiment, a method includes: receiving, by a processor, a first command recognized from a first speech utterance by a first language model; receiving, by the processor, a second command recognized from the first speech utterance by a second language model; determining, by the processor, at least one of similarities and dissimilarities between the first command and the second command; processing, by the processor, the first command and the second command with at least one rule of an error model based on the similarities and dissimilarities to determine a root cause; and selectively executing a recovery process based on the root cause.

In another example, a system includes a first non-transitory module that, by a processor, receives a first command recognized from a first speech utterance from a first language model, receives a second command recognized from the first speech utterance from a second language model, and determines at least one of similarities and dissimilarities between the first command and the second command. The system further includes a second non-transitory module that, by a processor, processes the first command and the second command with at least one rule of an error model based on the similarities and dissimilarities to determine a root cause. The system further includes a third non-transitory module that, by a processor, selectively executes a recovery process based on the root cause.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
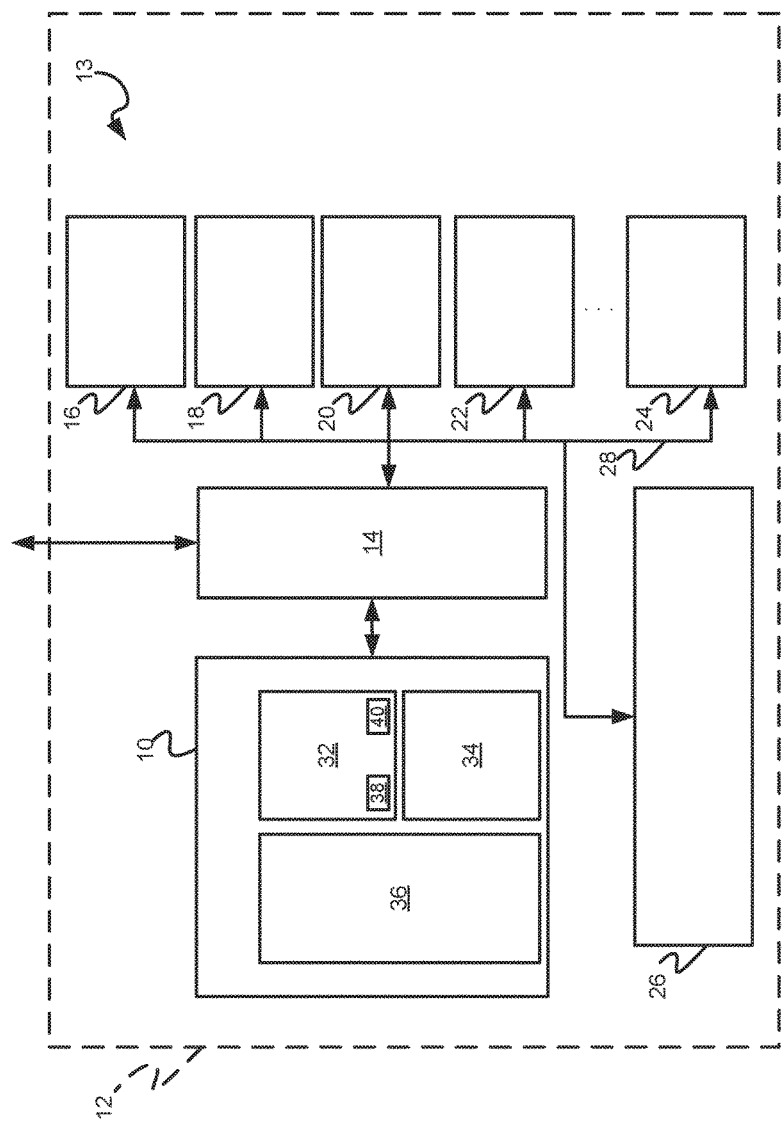
FIG. 1 is a functional block diagram of a vehicle that includes a speech system in accordance with various exemplary embodiments.

With initial reference to FIG. 1, in accordance with exemplary embodiments of the present disclosure, a speech system 10 is shown to be included within a vehicle 12. The speech system 10 provides speech recognition and a dialog for one or more vehicle systems 13 through a human machine interface module (HMI) module 14. Such vehicle systems 13 may include, for example, but are not limited to, a phone system 16, a navigation system 18, a media system 20, a telematics system 22, a network system 24, or any other vehicle systems or non-vehicle systems 26 that may include a speech dependent application. As can be appreciated, one or more embodiments of the speech system 10 of the present disclosure can be applicable to systems other than a vehicle, for example, a watch, a robot, a portable electronic device, etc. and thus, is not limited to the present vehicle example. For exemplary purposes, the speech system 10 will be discussed in the context of the vehicle example.

In various embodiments, the speech system 10 communicates with the multiple vehicle systems 16-24 and/or other vehicle and non-vehicle systems 26 through the HMI module 14 and a communication bus and/or other communication means 28 (e.g., wired, short range wireless, or long range wireless). The communication bus can be, for example, but is not limited to, a CAN bus.

Generally speaking, the speech system 10 includes an automatic speech recognition (ASR) module 32, a dialog manager module 34, and an error detection and recovery module 36. As can be appreciated, the ASR module 32 and the dialog manager module 34 may be implemented as separate systems and/or as a combined system. As can further be appreciated, the modules of speech system 10 can be implemented all on the vehicle 12 or part on the vehicle 12 and part on a remote system such as a remote server (not shown).

In various embodiments, the ASR module 32 receives and processes speech utterances from the HMI module 14. The ASR module 32 generates recognized commands from the speech utterance. In accordance with the present disclosure, the ASR module 32 processes the speech utterances using at least two different language models 38, 40. The ASR module 32 produces a recognized command from each of the two different language models 38, 40. Each model used offers an advantage in at least one of the following: the number of phrases supported, the depth of the phrases, a latency of the processing, the accuracy of the recognition, and the processing time. The combination of the models chosen provides advantages in at least two of the above listed. For example, in various embodiments, the first language model 38 can be a fixed model that includes a fixed list of recognizable commands, referred to as a fixed list model. A fixed list model offers the advantage of improved latency, improved accuracy, and improved processing time and can be considered a more optimal model. Such model can include, but is not limited to a Finite State Grammar (FSG). In another example, the second language model 40 can have a broader scope of recognition of phrases, referred to as a wider scope model. A wider scope model recognizes a wider scope of commands however, provides higher latency and decreased accuracy. Such model can include, but is not limited to, a Statistical Language Model (SLM). As can be appreciated, the models implemented by the ASR module 32 can be any language models and are not limited to the present examples. The dialog manager module 34 typically receives the results of ASR module 32 and manages an interaction sequence and prompts that are delivered back to the user through the HMI module 14.

In some instances, errors may occur in the process of recognizing the commands. The error detection and recovery module 36 receives the two or more recognized commands from the ASR module 32 and processes the recognized commands for errors. For example, if the two recognized commands are not substantially the same, the error detection and recovery module 36 processes the recognized commands with an error model to identify a root cause. In various embodiments, the error model includes rules for identifying errors between two commands and root causes associated with the rules.

For example, an exemplary speech utterance may include: "Call Dorian on mobile." The first language model 38 may produce the recognized command: "Call three one one," if a contact list that lists Dorian cannot be found. Similarly, the second language model 40 may produce the recognized command: "Call phone and on mobile." The error detection and recovery module 36 processes the two recognized commands with the error model. The error model identifies similarities and/or dissimilarities in the commands and selects one or more particular rules based on the similarities and/or dissimilarities. For example, given the above example, the error model identifies the "call" instruction as a similarity. The error model selects a rule associated with the "call" similarity and processes the two recognized commands with the rule. An example "call" rule may include: if a first recognized command was generated by a FSG language model and includes numbers, and the second recognized command was generated by a SLM language model and includes a random object, then the root cause is "no contact list." As can be appreciated, this rule is merely one example, as the error model can include any number of rules defined for any number of similarities and dissimilarities. In various embodiments, the rules are defined based on similarities and/or dissimilarities that are commonly generated by two known language models.

Once the root cause has been identified, the error detection and recovery module 36 makes an attempt to recover from the error without the user's participation and/or with the user's participation. For example, the error detection and recovery module 36 may generate signals to one or more of the vehicle systems 13 to recover without the need of the user's participation. Given the example above, if the root cause is "no contact list," the error detection and recovery module 36 may generate control signals to a Bluetooth system (e.g., of the network system 24) or other system of the vehicle 12 to reload a contact list and inform the user about the reloading.

In another example, the error detection and recovery module 36 may generate notification signals, speech prompts, and/or visual prompts that notify the user of the error and that request feedback. Given the example above, if the root cause is "no contact list," the error detection and recovery module 36 may output speech prompts and an interaction sequence to the dialog manager module 34 that include "Sorry, it seems that you are trying to call a contact when no contact list is available. Do you want to pair your phone?" Alternatively, given the example above, if the root cause is "no contact list," the error detection and recovery module 36 may generate notification signals including visual prompts that display the above prompt and that include selection icons for selection of a phone to download the contact list from.

Figure 2:
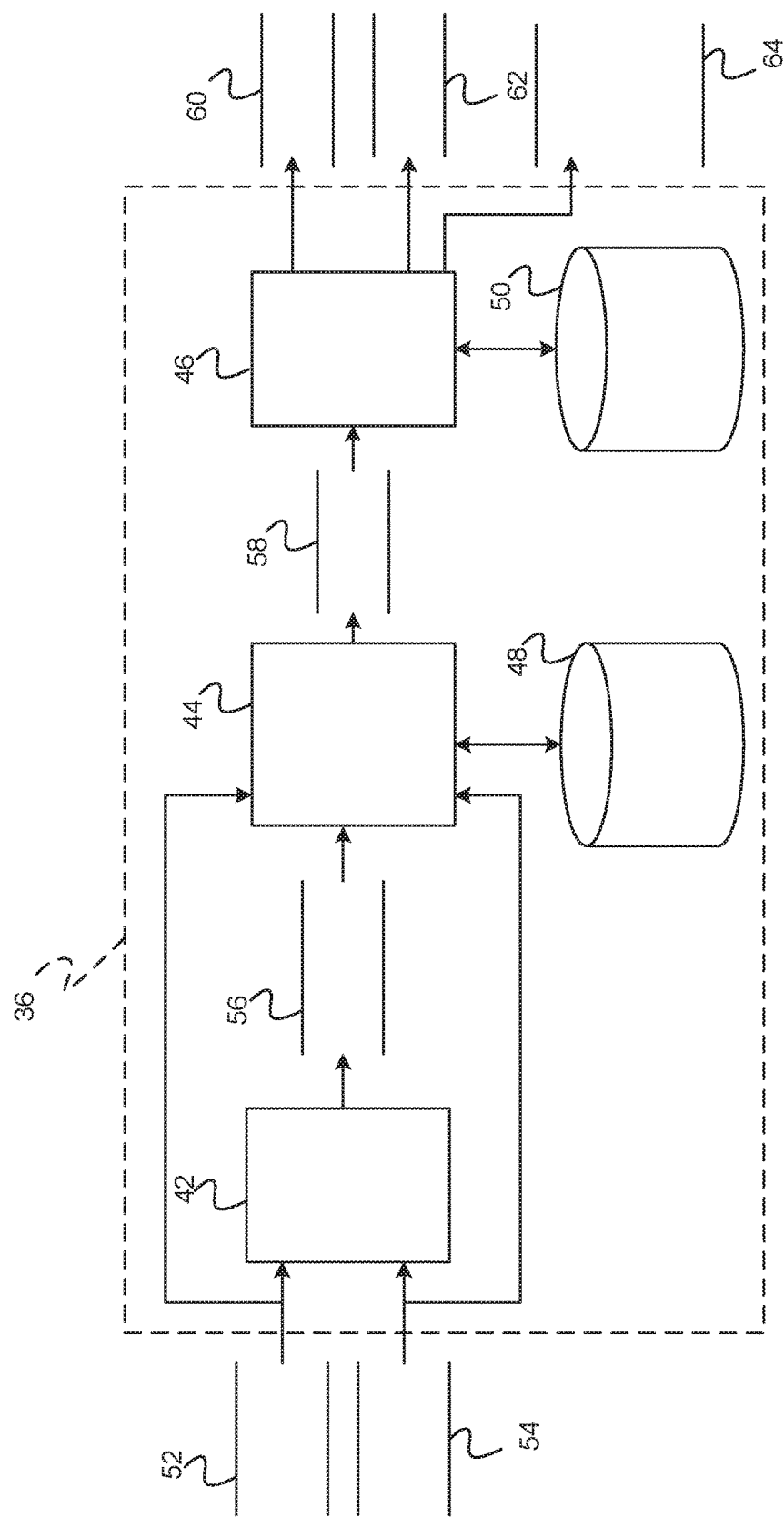
FIG. 2 is a dataflow diagrams illustrating an error detection and recovery module of the speech system in accordance with various exemplary embodiments.

Referring now to FIG. 2, a dataflow diagram illustrates the root cause detection and recovery module 36 in accordance with various embodiments. As can be appreciated, various embodiments of error detection and recovery module 36, according to the present disclosure, may include any number of sub-modules. For example, the sub-modules shown in FIG. 2 may be combined and/or further partitioned to similarly identify a root cause in errors and to recover from the root cause. In various embodiments, the data received by the root cause detection and recovery module 36 may be received from the ASR module 32, or other modules of the speech system 10. In various exemplary embodiments, the error detection and recovery module 36 includes an error detection module 42, a root cause determination module 44, a root cause recovery module 46, an error model datastore 48, and a recovery processes datastore 50.

The error model datastore 48 stores one or more error models. The error models include one or more rules for processing command data to determine a root cause. The recovery processes datastore 50 stores one or more recovery processes. The recovery processes include one or more steps for recovering from an error given a root cause.

The error detection module 42 receives as input first command data 52 corresponding to the first recognized command from the first language model and second command data corresponding to the second command data 54 from the second language model. The error detection module 42 compares the first command data 52 and the second command data 54. If sufficient differences exist (e.g., a threshold number of differences has been identified), then the error detection module 42 determines that an error is present. When an error is present, the error detection module 42 compares the first command data 52 and the second command data 54 and generates similarity data 56 indicating the similarities and/or dissimilarities in the two commands.

The root cause determination module 44 receives as input the first command data 52, the second command data 54, and the similarity data 56. The root cause determination module 44 processes the first command data 52 and the second command data 54 based on the similarity data 56. For example, the root cause determination module 44 retrieves from the error model datastore 48 the error model defining one or more rules associated with the similarities and/or dissimilarities identified by the similarity data 56. The root cause determination module 44 then processes the first command data 52 and the second command data 54 using the one or more rules to identify the root cause. The root cause determination module 44 generates root cause data 58 based thereon.

The root cause recovery module 46 receives as input the root cause data 58. Based on the root cause data 58, the root cause recovery module 46 retrieves a recovery process from the recovery processes datastore 50 and executes the recovery process. In various embodiments, if multiple recovery processes are provided for a particular root cause, the root cause recovery module 46 selects a recovery process to be used based on a priority scheme. For example, the priority scheme may indicate that a recovery process that does not require user interaction may be selected first and a recovery processes requiring user interaction may be selected thereafter (e.g., if the first recovery process does not allow for recovery) based on a level of interaction (e.g., those recovery process having a minimal interaction being selected first, and so on).

In various embodiments, the recovery process, when executed by the root cause recovery module 46 generates one or more control signals 60 to one or more vehicle systems 13 to cause the vehicle system 13 to recover from the error. For example, the recovery process may generate one or more control signals 60 to a short range network system to cause the short range communication to obtain a contact list from a paired device. As can be appreciated, other control signals can be generated as the disclosure is not limited to the present examples. In various embodiments, the recovery process, when executed by the root cause recovery module 46, generates one or more notification signals 62 to cause a vehicle system to notify the user of the root cause. For example, the recovery process may generate one or more notification signals 62 to the media system 20 to cause a message to be displayed by a display device.

In various embodiments, the recovery process, when executed by the root cause recovery module 46, generates dialog prompt data and/or interaction sequence data 64 that is received by the dialog manager module 34. For example, the recovery process may generate dialog prompts that are used by the dialog manager to communicate the root cause and/or error to the user via the speech system 10. As can be appreciated, in various embodiments, the recovery process can generate any combination of control signals, notification signals, and/or dialog prompt data and/or interaction sequence data 64 to recover from the error based on the determined root cause.

Figure 3:
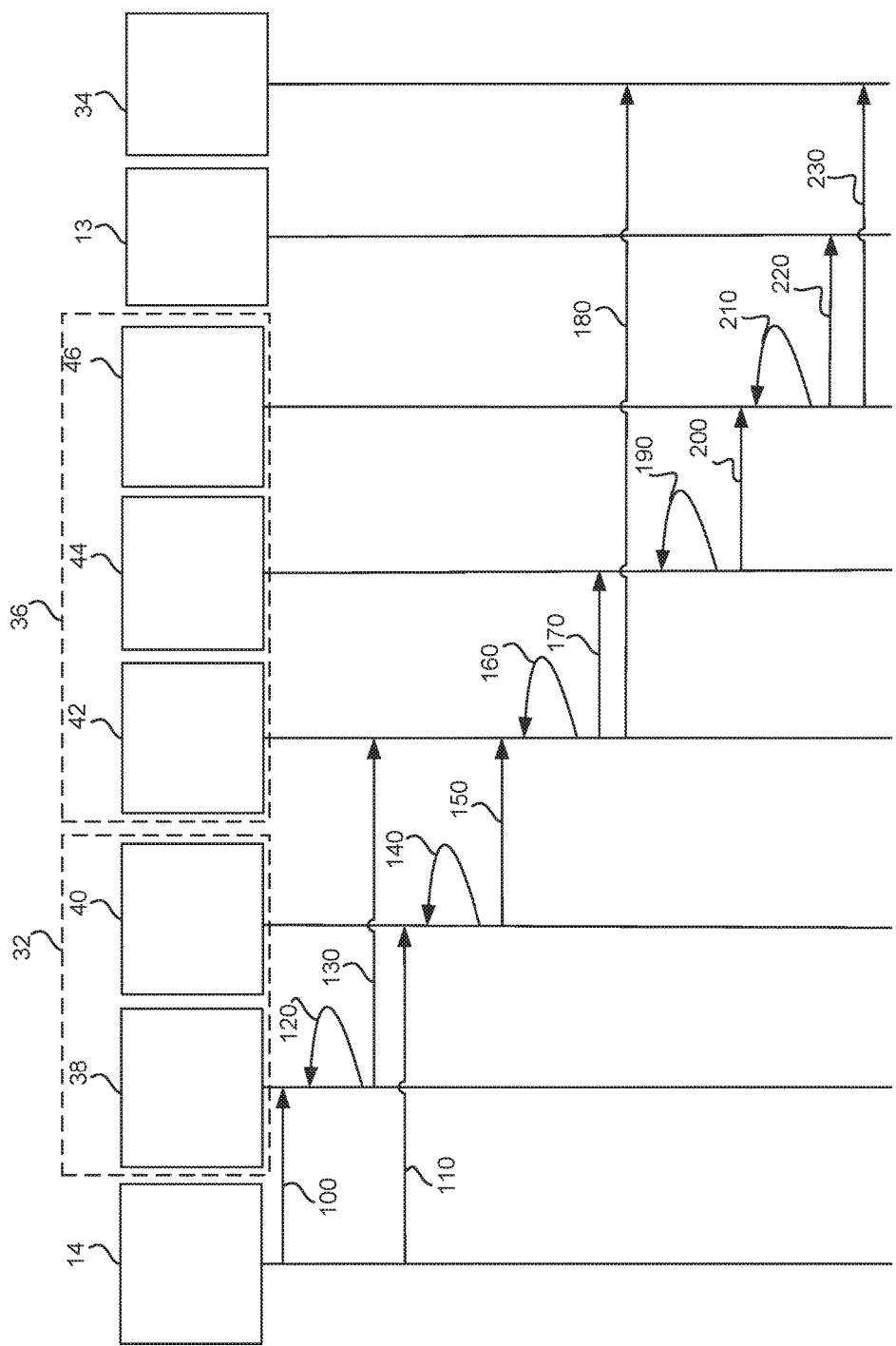
FIG. 3 is a sequence diagram illustrating error detection and recovery methods that may be performed by the speech system in accordance with various exemplary embodiments.

Referring now to FIG. 3 and with continued reference to FIGS. 1-2, a sequence diagram illustrates root cause identification and recovery methods that may be performed by the speech system 10 in accordance with various exemplary embodiments. As can be appreciated in light of the disclosure, the order of operation within the methods is not limited to the sequential execution as illustrated in FIG. 3, but may be performed in one or more varying orders as applicable and in accordance with the present disclosure. As can further be appreciated, one or more steps of the methods may be added or removed without altering the spirit of the method.

As shown, the method begins when a user speaks a command which is received by the HMI module 14. The HMI module 14, in turn, provides the spoken command to the speech recognition system with the first language model 38 at 100 and to the speech recognition system with the second language model 40 at 110. The speech recognition system with the first language model 38 processes the spoken command at 120 to determine a first recognized command. The speech recognition system with the first language model 38 provides the first command data 52 to the root cause determination module 44 at 130. Substantially simultaneously or thereafter, speech recognition system with the second language model 40 processes the spoken command at 140 to determine a second recognized command. The speech recognition system with the second language model 40 provides the second command data 54 to the root cause determination module 44 at 150. The error detection module 42 compares the first command data 52 and the second command data 54 with one or more decoders to determine whether an error exists at 160. If an error exists, the error detection module 42 provides the first command data 52, the second command data 54, and the similarity data 56 to the root cause determination module 44 at 170. Optionally, if an error does not exist, confirmation data can be sent to the dialog manager module 34 indicating that the command is confirmed at 180.

If an error exists, the root cause determination module 44 retrieves one or more rules from the error model datastore 48 based on the similarity data 56 and processes the first command data 52 and the second command data 54 using the one or more rules to determine a root cause at 190. The root cause determination module 44 provides the root cause data 58 to the root cause recovery module 46 at 200. The root cause recovery module 46 determines and executes a recovery process based on the root cause data 58 at 210. In some instances, the recovery process includes generating control signals 60 and/or notification signals 62 to one or more vehicle systems 13 at 220. In some instances, the recovery process includes generating prompt data and/or interaction sequence data 64 to the dialog manager module 34 at 230. As can be appreciated, recovery processes can continue to be executed until the root cause has been recovered from, and/or it is determined that the root cause cannot be recovered from.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of recovering from an error in a speech recognition system, comprising:
   receiving, by a processor, a first command recognized from a first speech utterance by a first language model;
   receiving, by the processor, a second command recognized from the first speech utterance by a second language model;
   determining, by the processor, at least one of similarities and dissimilarities between the first command and the second command;
   determining, by the processor, a root cause by processing the first command and the second command with at least one rule of an error model based on the similarities and dissimilarities; and
   selectively executing a recovery process based on the root cause.

2. The method of claim 1 wherein the recovery process includes generating control signals to one or more vehicle systems to automatically recover from the root cause.

3. The method of claim 1 wherein the recovery process includes generating at least one of prompt data and interaction sequence data to recover from the root cause.

4. The method of claim 1 further comprising:
processing the first speech utterance with the first language model and a decoder; and
processing the first speech utterance with the second language model and the decoder or an other decoder, wherein the decoder or the other decoder is included in a remote server or offline.

5. The method of claim 4 wherein the first language model is a Finite State Grammar model, and wherein the second language model is a Statistical Language Model.

6. The method of claim 1 further comprising retrieving the at least one rule of the error model based on the at least one of similarities and dissimilarities.

7. The method of claim 6 wherein the at least one rule is defined based on at least one of similarities and dissimilarities that are commonly generated by at least two known language models.

8. The method of claim 1 further comprising retrieving the recovery process based on the root cause.

9. The method of claim 1 wherein the selectively executing the recovery process is based on a priority scheme.

10. The method of claim 9 wherein the priority scheme is based on a level of interaction of a user.

11. A system for recovering from an error in a speech recognition system, comprising:
a first non-transitory module that, by a processor, receives a first command recognized from a first speech utterance from a first language model, receives a second command recognized from the first speech utterance from a second language model, and determines at least one of similarities and dissimilarities between the first command and the second command;
a second non-transitory module that, by a processor, determines a root cause by processing the first command and the second command with at least one rule of an error model based on the similarities and dissimilarities; and
a third non-transitory module that, by a processor, selectively executes a recovery process based on the root cause.

12. The system of claim 11 wherein the recovery process includes generating control signals to one or more vehicle systems to automatically recovery from the root cause.

13. The system of claim 11 wherein the recovery process includes generating at least one of prompt data and interaction sequence data to recover from the root cause.

14. The system of claim 11 further comprising a fourth non-transitory module that, by a processor, processes the first speech utterance with the first language model and a decoder, and that processes the first speech utterance with the second language model and the decoder or an other decoder, wherein the decoder or the other decoder is included in a remote server or offline.

15. The system of claim 14 wherein the first language model is a Finite State Grammar model and where the second language model is a Statistical Language Model.

16. The system of claim 11 wherein the second non-transitory module retrieves the at least one rule of the error model based on the at least one of similarities and dissimilarities.

17. The system of claim 16 wherein the at least one rule is defined based on at least one of similarities and dissimilarities that are commonly generated by at least two known language models.

18. The system of claim 11 wherein the third non-transitory module retrieves the recovery process based on the root cause.

19. The system of claim 11 wherein the third non-transitory module selectively executes the recovery process based on a priority scheme.

20. The system of claim 19 wherein the priority scheme is based on a level of interaction of a user.

* * * * *